United States Patent [19]

Mitsugu

[11] Patent Number: 5,365,038
[45] Date of Patent: Nov. 15, 1994

[54] COVERED DEFROSTER WITH A DEFROSTING PLATE OVER A LATENT HEAT SOURCE

[75] Inventor: Udagawa Mitsugu, Tottori, Japan

[73] Assignee: Kabushiki Kaisha Nissei Giken, Tottori, Japan

[21] Appl. No.: 956,316

[22] Filed: Oct. 7, 1992

[30] Foreign Application Priority Data

Feb. 14, 1992 [JP] Japan ............................ 4-014482[U]
Feb. 14, 1992 [JP] Japan ............................ 4-014483[U]
May 29, 1992 [JP] Japan ............................ 4-043168[U]

[51] Int. Cl.⁵ .................. A47J 39/00; A47G 23/04; F24J 1/00; H05B 1/00
[52] U.S. Cl. .................................. 219/386; 99/425; 126/246; 126/261; 219/430; 219/439; 219/521
[58] Field of Search ............... 219/432, 433, 437, 439, 219/438, 436, 430, 441, 442, 386, 387, 521; 126/246, 261, 263, 246; 99/425

[56] References Cited

U.S. PATENT DOCUMENTS

| | | | |
|---|---|---|---|
| 1,045,101 | 11/1912 | Wojidkow | 126/246 X |
| 1,316,006 | 9/1919 | Wagner | 126/246 X |
| 1,530,224 | 3/1925 | Baer et al. | 99/425 X |
| 1,961,756 | 6/1934 | French | 219/439 X |
| 2,046,973 | 7/1936 | Schroeder | 99/425 |
| 2,080,283 | 5/1937 | Lowenfels | 126/246 X |
| 2,314,467 | 3/1943 | Tubbs | 219/439 |
| 2,512,284 | 6/1950 | Mumford | 126/263 X |
| 2,817,744 | 12/1957 | Free | 219/439 |
| 2,876,634 | 3/1959 | Zimmerman et al. | 126/246 X |
| 3,130,288 | 4/1964 | Monaco et al. | 219/439 X |
| 3,191,024 | 6/1965 | Hocker | 99/425 X |
| 3,557,774 | 1/1971 | Kreis | 126/246 |
| 3,875,370 | 4/1975 | Williams | 126/246 X |
| 4,510,919 | 4/1985 | Benmussa | 126/263 |
| 5,045,672 | 9/1991 | Scott | 219/439 |
| 5,125,391 | 6/1992 | Srivastava et al. | 126/246 |

*Primary Examiner*—Anthony Bartis
*Attorney, Agent, or Firm*—Armstrong, Westerman, Hattori, McLeland & Naughton

[57] ABSTRACT

A defroster having storage area for storing a heat releasing substance and a defrosting plate having a product supporting surface surrounded by an upstanding perimeter edge wall and arranged above the storage area in heat exchange relationship therewith has a receiving groove extending around a portion of at least one perimeter edge of said defrosting plate for receiving ice water which results from defrosting of a frozen food product positioned on the supporting surface of the defroster. The storage area includes a hot water reservoir in a first embodiment and the storage area includes a mounting tray for holding a heating element in a second embodiment of the invention. The defroster also includes a cover which covers the product supporting surface, The defroster enables frozen food products such as raw meat and fish to remain fresh after defrosting, and is an improvement over defrosting at room temperature, defrosting in a microwave oven, or defrosting in a refrigerator, etc.

14 Claims, 5 Drawing Sheets

COVERED DEFROSTER WITH A DEFROSTING PLATE OVER A LATENT HEAT SOURCE

BACKGROUND OF THE INVENTION

The present invention relates to a defroster for defrosting frozen food products without deteriorating their quality and flavor.

In the prior art, such frozen food products were naturally defrosted with time under a moderate ambient temperature condition in a room or relatively low temperature condition in a refrigerator. Also, the defrosting may have been carried out with the use of a heating apparatus such as a microwave oven.

However, such defrosting methods of the prior art have some disadvantages. Natural defrosting under a room temperature or a low temperature condition takes a considerable length of time. If defrosted food remains uncared for after the end of a defrosting time, it will be lowered in the freshness and the flavor. Defrosting with a microwave oven tends to cause overheating which results in the loss of flavor in delicate food products. Particularly, raw food such as "sashimi" (fresh fish meat) which should be tasted with no process is definitely degraded by the oven defrosting and its market value will possibly be reduced.

SUMMARY OF THE INVENTION

According to the present invention, means for solving the above disadvantages comprises a hot water reservoir and a defrosting plate provided above the hot water reservoir. Preferably, the defrosting plate is provided with a plurality of fins which extend throughout the interior of the hot water reservoir.

More preferably, a detachable cover is provided for covering the defrosting plate from above.

Another means according to the present invention comprises a defrosting plate and a mounting tray provided beneath the defrosting plate for loading and unloading a heating element.

In action, a means or, namely, a defroster of the present invention which comprises a hot water reservoir and a defrosting plate provided above the hot water reservoir allows the defrosting plate to be heated with an amount of hot water filled in the hot water reservoir and, thus, defrost a frozen food product placed thereon gradually. Also, the fins arranged beneath the defrosting plate and bathed in the hot water can efficiently transmit heat to the defrosting plate, even if the amount of the hot water is low.

The detachable cover covering over the defrosting plate can contain both the melted ice water resulting from the defrosting of the frozen food product and a portion of the vapor from the hot water below in a space between the cover and the defrosting plate. This prevents the surface of the defrosted food product from drying. Also, the cover protects the frozen food product from dirt or impurities during the defrosting, producing a sanitary condition.

Another embodiment of the defroster of the present invention has a mounting tray provided beneath the defrosting plate for loading a heating element allows the defrosting plate to be heated by heat of the heating element loaded on the mounting tray, and thus, defrosts a frozen food product placed thereon. The heating element may preferably be, but is not limited to, a pocket heater for heating by chemical reaction or a small-sized hot water container.

DETAILED DESCRIPTION OF THE PREFERRED EMBODIMENTS

Figure 1:
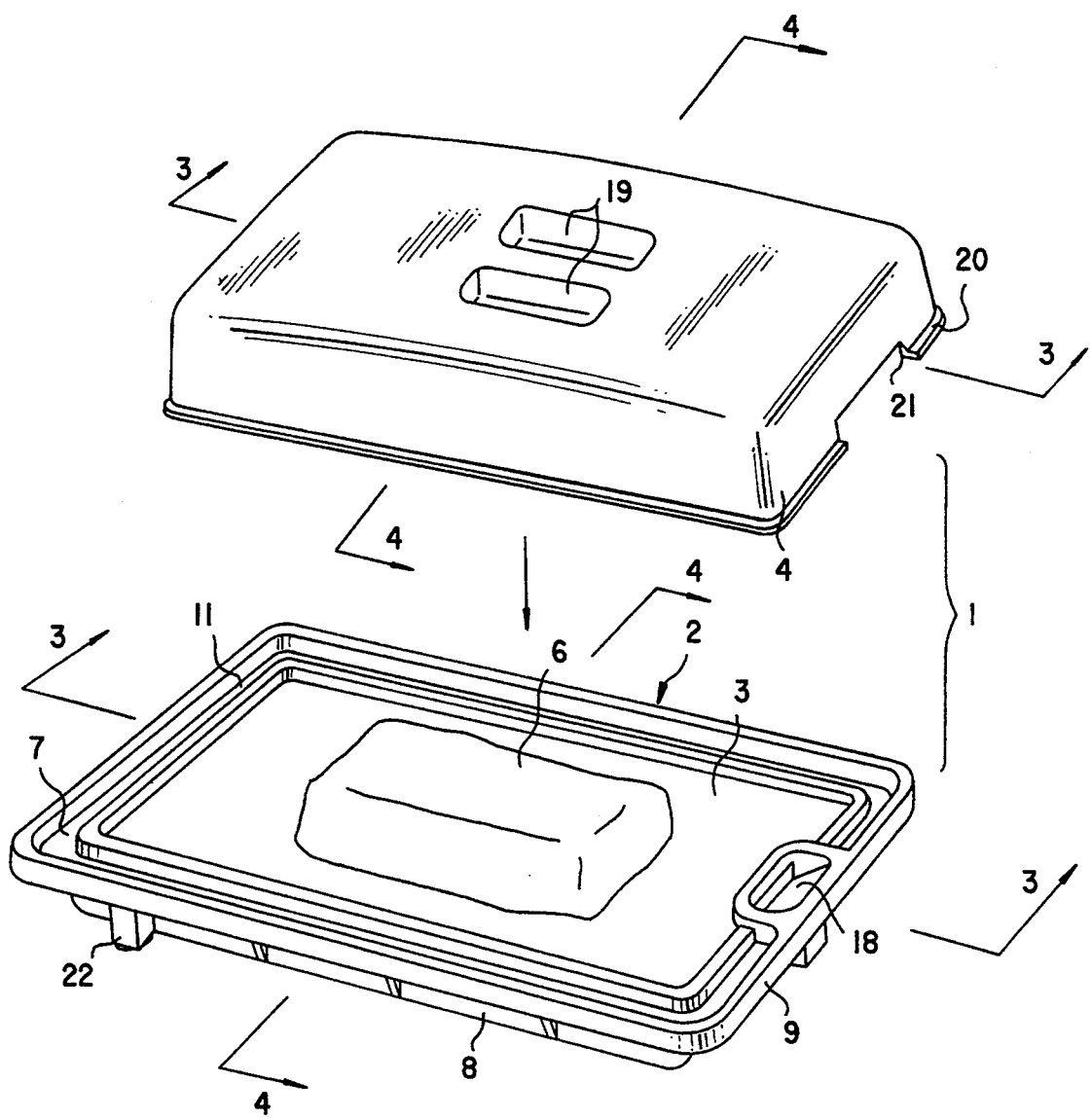
FIG. 1 is a perspective overall view showing a first embodiment of the present invention in use.

The first embodiment of the present invention will be described referring to FIGS. 1 to 4.

The defroster 1 of the first embodiment comprises basically a hot water reservoir 2 and a defrosting plate 3 provided above the hot water reservoir 2. Preferably, a cover 4 is also provided for covering over the upper surface of the defrosting plate 3. The defroster 1 is designed for defrosting a frozen food product 6 placed on the defrosting plate 3 by means of heat from an amount of hot water 5 filled in the hot water reservoir 2. The cover 4, when used, can contain a degree of moisture to prevent the services of the food product 6 from drying, ensuring a more favorable defrosting.

Figure 2:
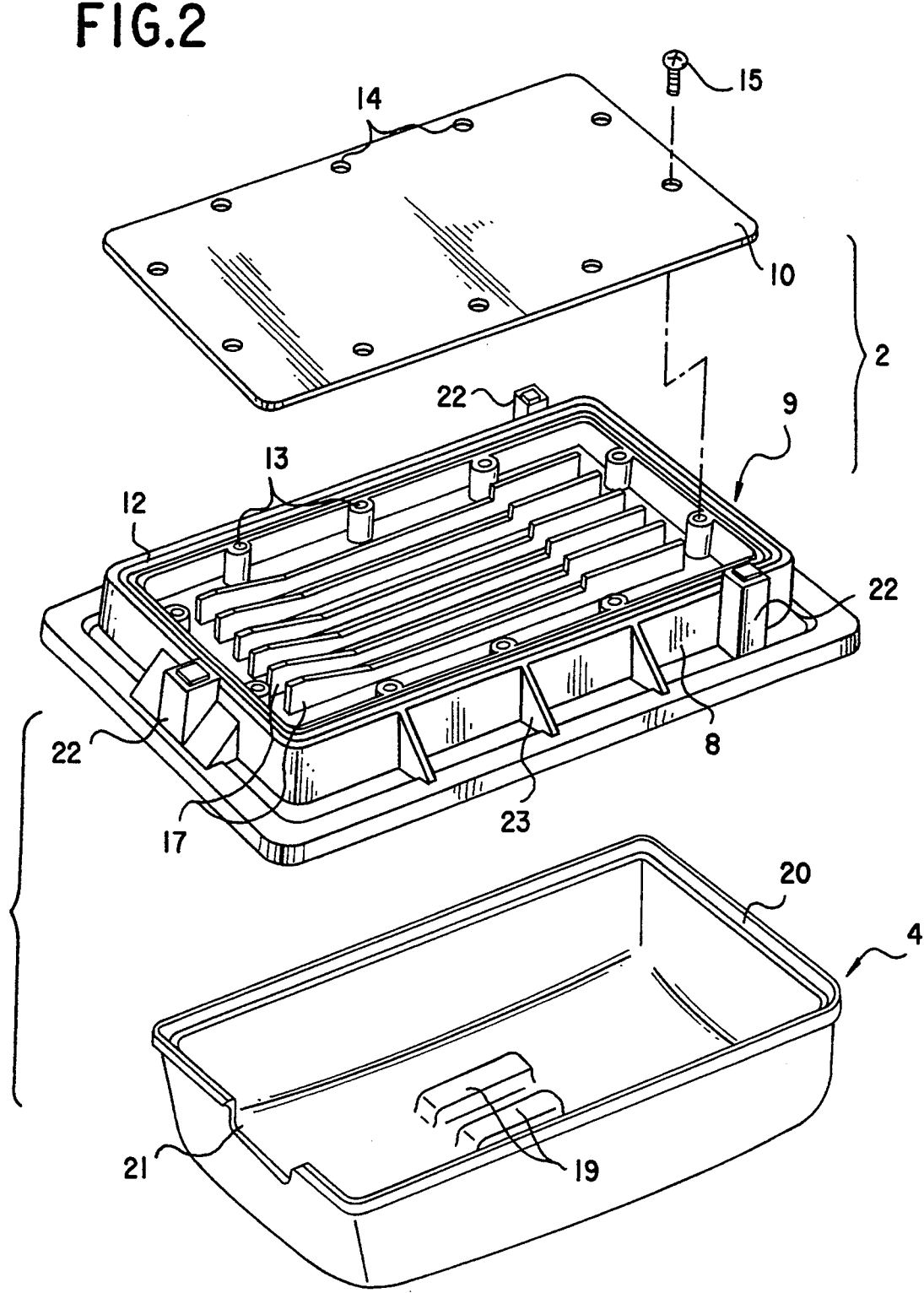
FIG. 2 is an exploded perspective view of the first embodiment seen from the bottom side.
Figure 3:
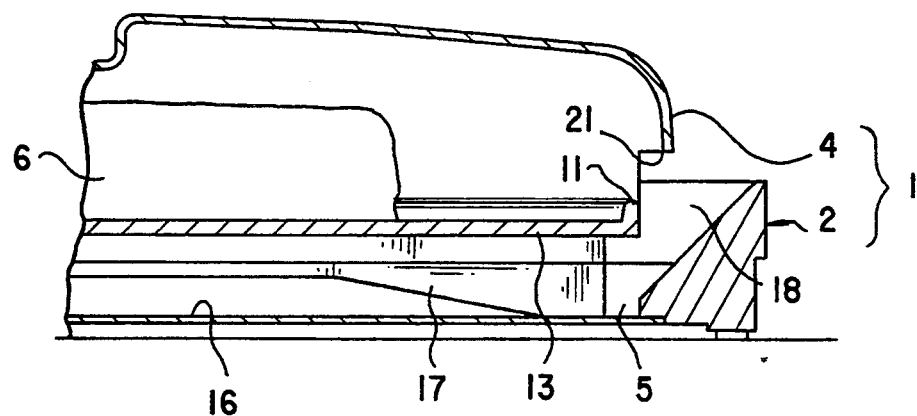
FIG. 3 is a cross sectional view of a hot water inlet of the first embodiment illustrated in FIGS. 1 and 2.
Figure 4:
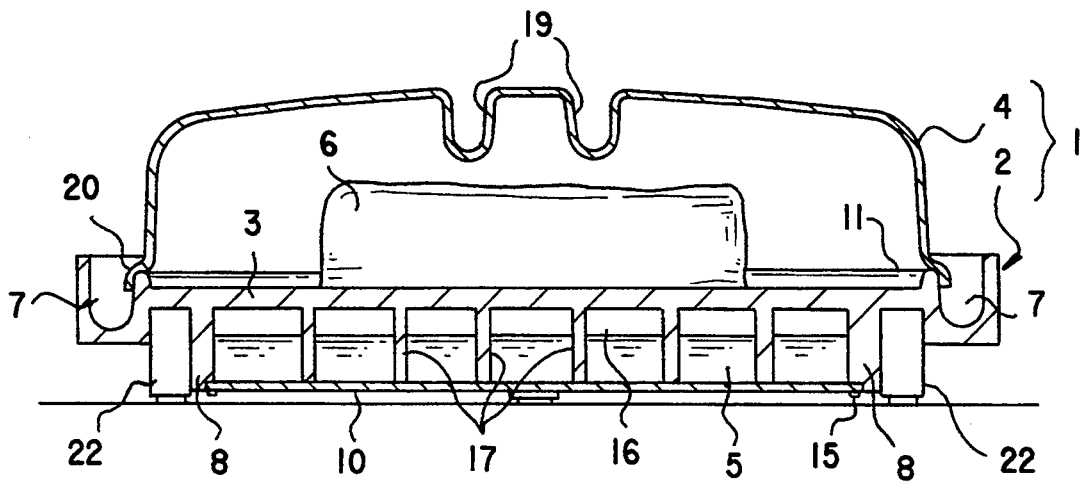
FIG. 4 is a center-line cross sectional view of the first embodiment explaining its interior arrangement.

As best illustrated in FIGS. 1 and 2, the hot water reservoir 2 incorporates the defrosting plate 3 at an upper side and incorporates a planar tray 9 which has a receiving groove 7 formed in the circumference thereof, and incorporates a four-sided frame 8 extending downwardly from the lower side of the defrosting plate 3, and incorporates a sealing plate 10 provided for closing the bottom of the planar tray 9.

The defrosting plate 3 is arranged to hold the frozen food product 6 thereon which can be defrosted by heat emitted from the hot water 5.

The receiving groove 7 is provided for accepting and retaining a volume of melting ice water which results from the defrosting of the frozen food product 6. The receiving groove 7 is hence arranged lower than the defrosting plate 3. In action, the melting ice water will flow into the receiving groove 7 when it increases to a level such that it runs over a peripheral wall 11 of the defrosting plate 3.

The four-sided frame 8 extends downwardly from the lower side of the defrosting plate 3 and carries a packing 12 at the lowermost side thereof to which the sealing plate 10 is attached. The four-sided frame 8 also has a plurality of screw holes 13. Screws 15 extend through screw openings 14 in the sealing plate 10 and are threaded into the screw holes 13 of the four-sided frame 8, thus tightening the sealing plate 10 to the planar tray 9. As a result, an interior space 16 of the hot water reservoir 2 is formed for the storage of hot water. The defrosting plate 3 may have a number of fins 17 provided on the lower side thereof in order to ease propagation of the heat of the hot water 5 filled in the interior space 16.

Also, the planar tray 9 has a hot water inlet 18 arranged by eliminating a portion of the receiving groove 7 so that a given amount of hot water can be supplied into the interior space 16 of the hot water reservoir 2.

If applied, the cover 4 is formed as a lid shape, made of e.g. a transparent synthetic resin material, having a hand grip 19 at top and a ribbed hem 20 at lowermost side for closely seating on the peripheral wall 11 of the defrosting plate 3. The cover 4 also has a notch 21 provided in the hot water inlet end thereof in order to ease the loading of the hot water. In addition, there are provided legs 22 supporting the hot water reservoir 2 and reinforcements 23 shown in FIG. 2, arranged for strengthening the four-sided frame 8 and encouraging the propagation of heat.

The action of defrosting the frozen food product 6 on the defroster 1 of the first embodiment starts with placement of the frozen food product 6 on the defrosting plate 3. If necessary, the cover 4 is applied. Then, a given amount of hot water is supplied into through the hot water inlet 18. When the cover 4 is in use, its notch 21 facilitates the supplying of water. A short time later, the hot water reservoir 2 becomes warm due to being heated by the hot water. Accordingly, the heat is propagated throughout the defrosting plate 3, thus defrosting the frozen food product 6. Since the notch 21 of the cover 4 is located above the hot water inlet 18, a portion of the steam coming out from the hot water inlet 18 runs into the cover 4, supplying moisture. Also, melting ice water resulting from the defrosting of the frozen food product 6 produces moisture. Hence, the defrosting food product 6 stays in a moist atmosphere and thus can remain undried at its surface.

After the completion of the defrosting the frozen food product 6, the cover 4 is removed for the unloading of the defrosted food product 6. The hot water which is now lukewarm is then discharged through the hot water inlet 18 by tilting the hot water reservoir 2.

A defroster according to the second embodiment of the present invention will now be described referring to FIGS. 5 and 6.

Figure 5:
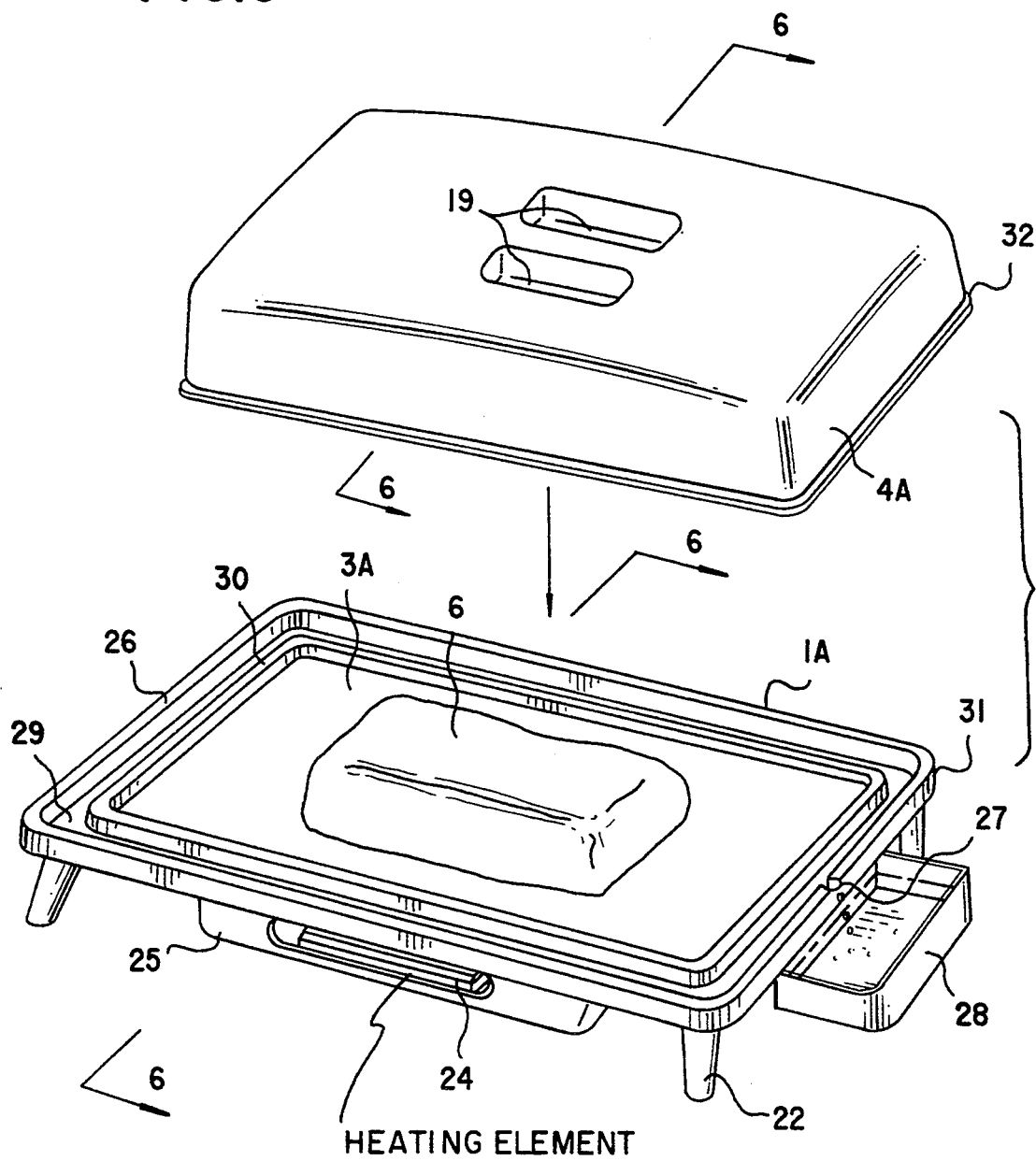
FIG. 5 is a perspective overall view showing a second embodiment of the present invention in use.
Figure 6:
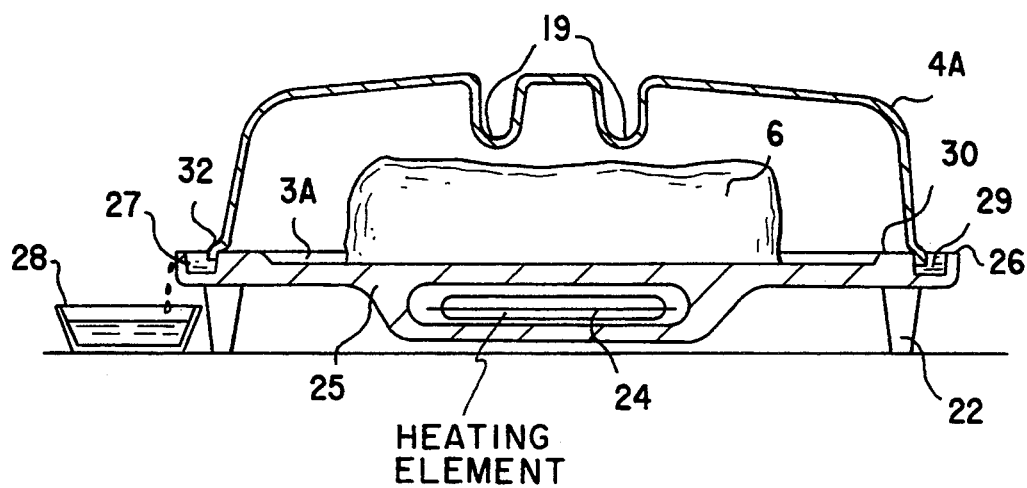
FIG. 6 is a center-line cross sectional view of the second embodiment illustrated in FIG. 5.

The defroster 1 of the second embodiment comprises basically a defrosting plate 3 provided above a main body 26, and a mounting tray 25 provided under the main body 26 for accommodating a heating element 24, as illustrated in FIGS. 5 and 6. In action, the defrosting plate 3 is heated by the heating element 24, thus defrosting a frozen food product 6 placed thereon. Preferably, a cover 4 is provided for containing moist air to avoid the drying of the surface of the frozen food product 6.

There is a receiving groove 29 provided between an inner wall 30 which is slightly higher than the defrosting plate 3 and a peripheral wall 31 so that it extends around the defrosting plate 3 arranged above the main body 26. When melting ice water resulting from the defrosting of the frozen food product 6 flows over the inner wall 30, it runs into the receiving groove 29. Then, the water will be discharged through a notch 27 provided in the peripheral wall 31 into a water pan 28.

The mounting tray 25 provided under the defrosting plate 3 is adapted for loading and unloading the heating element 24. Both the defrosting plate 3 and the mounting tray 25 may be formed of a metal material which is high in the transmission of heat. Accordingly, heat from the heating element 24 can propagate through the material as well as space to the defrosting plate 3, ensuring a greater efficiency in the defrosting action. Also, legs 22 are provided for supporting the main body 26.

The cover 4 may be formed as a lid shape made of e.g. a transparent synthetic resin material. Also, the cover 4 has at its top a hand grip 19 and at its lowermost side a ribbed hem 32 for closely seating on the outside edge of the inner wall 30.

The defrosting action on the defroster 1 of the second embodiment can start with loading of the heating element 24 onto the mounting tray 25 before or after placement of the frozen food product 6 on the defrosting plate 3. Then, heat emitted from the heating element 24 is propagated to the defrosting plate 3, thus defrosting the frozen food product 6 on the defrosting plate 3. As a result, melting ice water then flows on the defrosting plate 3 and when it increases to a certain level, it runs over the inner wall 30 into the receiving groove 29 before discharging through the notch 27 onto the water pan 28.

As is apparent from the foregoing description, the defroster of the present invention which comprises a hot water reservoir and a defrosting plate provided above the hot water reservoir allows the defrosting plate to be heated with an amount of hot water filled in the hot water reservoir. Accordingly, a frozen food product placed on the defrosting plate will be defrosted in a shorter time as compared with a substantial length of time needed for room-temperature defrosting. The shorter the time of defrosting, the less the defrosting food product is exposed to the ambient air. This allows the defrosted food product to hardly lose its freshness or flavor. In particular, unprocessed food products such as raw meat can remain intact and at their best after the defrosting.

The defrosting with the defroster of the present invention involves no direct heating, unlike the action of a microwave oven. Hence, the defrosting food product will be prevented from unfavorable change in the quality caused by overheating. In action, the temperature of the hot water will decrease gradually as the defrosting of the frozen food product goes on. This will also protect the defrosting food product from flavor loss triggered by an abrupt temperature change.

The defrosting plate is provided at its lowermost side with the fins extending throughout the interior of the hot water reservoir. Thus, the heat will be transmitted with efficiency even when the amount of the hot water is low. Also, it will be possible to carry out defrosting with the use of latent heat contained in the planer tray including the defrosting plate, when no hot water is supplied. The defroster of the present invention can be used in a variety of applications.

The cover applied for placement on the defrosting plate can contain a moist air so that the defrosting food product is prevented from drying at its surface during the defrosting action. This also allows the defrosted food product to remain fresh. Furthermore, the cover protects the frozen food product from dirt or impurities during the defrosting, ensuring a sanitary condition.

Similarly, the embodiment of the defroster of the present invention which has a mounting tray provided beneath the defrosting plate for loading a heating element allows the defrosting plate to be heated by the heating element. Accordingly, a frozen food product placed on the defrosting plate will be defrosted in a shorter time as compared with a substantial length of time needed for room-temperature defrosting. The shorter the time of defrosting, the less the defrosting food product is exposed to the ambient air. This allows the defrosted food product to hardly lose its freshness or flavor. In particular, unprocessed food products including raw meat can remain intact and at their best after the defrosting.

The defrosting with this defroster involves no direct heating, unlike the action of a microwave oven. Hence, the defrosting food product will be prevented from unfavorable change in the quality caused by overheating. In action, the temperature of the heating element will decrease gradually as the defrosting of the frozen food product goes on. This will also protect the defrosting food product from flavor loss triggered by an abrupt temperature change.

Also, it will be possible to carry out defrosting with latent heat generated in the defrosting plate and the mounting tray, when no heating element is loaded. The defroster of the present invention can be used in a variety of applications.

The cover applied for placement on the defrosting plate can contain a moist air so that the defrosting food product is prevented from drying at its surface during the defrosting action. This also allows the defrosted food product to remain fresh. Furthermore, the cover protects the frozen food product from dirt or impurities during the defrosting, ensuring a sanitary condition.

What is claimed is:

1. A defroster, comprising:
   storage means for storage of a heat releasing substance;
   a defrosting plate having a product supporting surface and arranged above the storage means in heat exchange relationship therewith;
   receiving means for receiving melt water which results from defrosting of a frozen food product supported by the defrosting plate of the defroster;
   said receiving means including a receiving groove extending along a portion of at least one perimeter edge of said defrosting plate;
   said receiving groove having a depth which extends below said product supporting surface along said portion of said at least one perimeter edge; and
   wherein said defroster further includes an upwardly extending perimeter edge wall extending above said product supporting surface and coextensive with at least a portion of said at least one perimeter edge of said defrosting plate; said upwardly extending perimeter edge wall being located between said receiving groove and said defrosting plate.

2. A defroster according to claim 1, wherein said storage means includes a hot water reservoir and wherein said heat releasing substance includes hot water.

3. A defroster according to claim 2, wherein the defrosting plate is provided at a lowermost side with a plurality of fins which extend throughout the interior of the hot water reservoir.

4. A defroster according to claim 1 or 2, further comprising a detachable cover for covering the defrosting plate from above.

5. A defroster according to claim 1, wherein said receiving groove extends around substantially the entire periphery of the defrosting plate, and wherein said upwardly extending perimeter edge wall extends around substantially the entire defrosting plate.

6. A defroster according to claim 5, further including a removable cover sized to fit over said defrosting plate.

7. A defroster according to claim 6, wherein said cover has a lower peripheral hem for closely seating on the upwardly extending perimeter edge wall.

8. A defroster according to claim 7, wherein said storage means includes a hot water reservoir and wherein said heat releasing substance includes hot water.

9. A defroster according to claim 8, wherein said defroster includes a hot water inlet; said cover being constructed to extend over at least a portion of said hot water inlet when located on said upwardly extending perimeter edge wall.

10. A defroster according to claim 9, wherein said hot water inlet is located between portions of the receiving groove and wherein said cover has a notch therein at a location above the hot water inlet when the cover is located on said defroster for ease of loading hot water.

11. A defroster according to claim 5, wherein a water pan is provided proximate an exit port on said receiving groove for receiving water accumulating in said receiving groove.

12. A defroster according to claim 5, wherein said product supporting surface is substantially planar.

13. A defroster according to claim 1, wherein said storage means includes a mounting tray and wherein said heat releasing substance includes a heating element, said mounting tray enabling loading and unloading of said heating element.

14. A defroster according to claim 13, wherein said heating element is selected from the group consisting of a hot water container and a pocket heater which heats by chemical reaction.

* * * * *